US012764352B2

(12) United States Patent

Chandrashekar et al.

(10) Patent No.: US 12,764,352 B2

(45) Date of Patent: Oct. 13, 2026

(54) SYSTEMS AND METHODS FOR IMPROVED MEDIA SLOT ALLOCATION

(71) Applicant: Adeia Guides Inc., San Jose, CA (US)

(72) Inventors: Padmassri Chandrashekar, Bangalore (IN); Daina Emmanuel, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/229,297

(22) Filed: Jun. 5, 2025

(65) Prior Publication Data

US 2025/0365457 A1 Nov. 27, 2025

Related U.S. Application Data

(63) Continuation of application No. 18/375,674, filed on Oct. 2, 2023, now Pat. No. 12,348,796, which is a continuation of application No. 17/184,183, filed on Feb. 24, 2021, now Pat. No. 11,812,074.

(51) Int. Cl.

| | |
|---|---|
| ***H04N 21/234*** | (2011.01) |
| ***H04N 21/258*** | (2011.01) |
| ***H04N 21/81*** | (2011.01) |
| ***H04N 21/845*** | (2011.01) |
| *H04N 21/2668* | (2011.01) |

(52) U.S. Cl.

CPC . *H04N 21/23424* (2013.01); *H04N 21/25891* (2013.01); *H04N 21/812* (2013.01); *H04N 21/8456* (2013.01); *H04N 21/2668* (2013.01)

(58) Field of Classification Search

CPC ................................................ H04N 21/23424

See application file for complete search history.

(56) References Cited

U.S. PATENT DOCUMENTS 11,276,434 B1 * 3/2022 Robert Jose ........... G06V 20/49

* cited by examiner

*Primary Examiner* — Michael H Hong

(74) *Attorney, Agent, or Firm* — HG LAW LLP

(57) ABSTRACT

Systems and methods for inserting auxiliary content slots within portions of media assets determined to be of interest to users. Segments of a media asset being viewed by a user are identified as being of particular interest to the user, with reference to a stored set of user preferences. User preferences may be consulted to determine which of these segments may be of likely interest to the viewer. Slots for auxiliary content, such as an advertisement, are then added to those segments deemed to be of likely interest. Auxiliary content such as ads may accordingly be displayed to a user at points within media assets at which the user is more likely to be paying attention, increasing the likelihood that auxiliary content will be viewed and perhaps interacted with by the user.

20 Claims, 6 Drawing Sheets

SYSTEMS AND METHODS FOR IMPROVED MEDIA SLOT ALLOCATION

CROSS-REFERENCE TO RELATED APPLICATIONS

This application is a continuation of U.S. patent application Ser. No. 18/375,674, filed Oct. 2, 2023, which is a continuation of U.S. patent application Ser. No. 17/184,183, filed Feb. 24, 2021, now U.S. Pat. No. 11,812,074, which are hereby incorporated by reference herein in their respective entireties.

BACKGROUND

Embodiments of the disclosure are directed generally to systems and methods for managing presentation of content. Embodiments of the disclosure are directed more specifically to systems and methods for improved media slot allocation.

SUMMARY

In recent years, the popularity of video on demand (VOD) content (e.g., via a cable provider or over-the-top (OTT) content) consumed by users has continued to increase alongside other forms of electronically-provided content. It is often desirable for content providers to present auxiliary content (e.g., advertisements, or ads) to the user prior to presentation of desired media content, or to interrupt the presentation of desired content to present the auxiliary content. However, content providers are often not satisfied with the way auxiliary content is presented with the desired content. In one approach, a button may appear on the screen after a certain period of presenting the auxiliary content to enable the rest of the auxiliary content to be skipped. However, such an approach fails to take into consideration that the user may be enjoying the auxiliary content, and thus it may be undesirable to provide the option to skip the auxiliary content (e.g., because the user may inadvertently skip the auxiliary content). In another approach, auxiliary content may be presented at random or predefined intervals, e.g., every ten minutes, at predetermined commercial breaks, and the like. This approach, however, risks placement of auxiliary content at undesirable times for the viewer, or at times when the viewer may not be viewing his or her content.

To overcome the limited ability of computer-based content delivery systems to engage users with auxiliary content, systems and methods are described herein for a computer-based process that selects and/or inserts auxiliary content such as advertisements at appropriate times based on user information or user preference, thus providing greater user engagement with such auxiliary content.

In some embodiments of the disclosure, content such as a video or other media asset is divided into segments (e.g., time segments) each representing a set of common features. With reference to a set of stored user preferences, certain segments are selected as aligning with the user's interests. Auxiliary content may then be inserted within segments deemed to align with user interests, and displayed for the user. Such auxiliary content may, for example, be an advertisement inserted within a video or other media asset viewed by the user. In some embodiments of the disclosure, auxiliary content may also be selected as aligning with the user's interests, such as with reference to the same set of stored user preferences. In this manner, auxiliary content such as advertisements may be placed within segments of a media asset that are more likely to be of interest to a user, and thus more likely to be viewed, increasing user engagement and auxiliary content views.

In some embodiments of the disclosure, a time index or selected point at media asset playback is selected within the media asset segment, and the auxiliary content is played back beginning at this time index. That is, the auxiliary content is inserted at any desired point within the selected media asset segment. For example, an advertisement slot may be inserted at any desired point within the selected media asset segment, and any desired advertisement may be selected and played back within this ad slot.

Once segments of a media asset are determined to be of likely interest to a viewer, time indexes within these segments may be picked for insertion of auxiliary content. Such time indexes may be selected in any manner. As one example, time indexes may be selected such that auxiliary content is inserted between segments (e.g., time indexes are selected at the end of a segment). Similarly, time indexes may be selected so that auxiliary content is inserted between spoken scenes, lines, or words, to prevent undesirable interruption of the media asset that users may find distasteful. Time indexes may be selected in any manner, to insert auxiliary content at any desired point within a media asset.

To accomplish this, in some embodiments of the disclosure, spoken or other words in the particular media asset segment may be determined such as via natural language processing (NLP), and the time indexes of these transcribed words may be noted. A time index for insertion of auxiliary content may then be selected between the time indexes of successive transcribed words, after the end of any string of transcribed words, or the like. As one example, sentences, monologues, lines of dialog, or the like may be identified from the transcribed words using a machine learning model, such as a convolutional neural network or generative adversarial network, trained to identify cohesive or related segments of text (e.g., a monologue, a line of dialog uttered by the same person, a scene, a song, a conversation or portion thereof, or the like), and time indexes may be selected for insertion of auxiliary content before, after, or between successive such text segments. In this manner, embodiments of the disclosure may prevent insertion of auxiliary content in the middle of dialog that the user may find interesting, instead opting to insert the auxiliary content before or after such dialog to prevent interruption and thus user annoyance.

Such machine learning models may also be employed to determine cohesive or related segments of text that correspond to a particular genre, such as dramatic or emotional dialog. Auxiliary content may then be inserted before or after such identified segments, to prevent annoying interruption of scenes that the user may find particularly engrossing. Alternatively, auxiliary content may be inserted within such segments but between spoken words, at quiet points, pauses in conversation, or the like, thus increasing the likelihood that the auxiliary content will be viewed but minimizing any related annoyance or interruption.

In some embodiments of the disclosure, auxiliary content may also be selected to suit user preferences. Thus, stored user preferences or profiles may be employed to determine types of auxiliary content that the user may prefer to view, or that may be more likely to result in interest, clickthroughs, product purchases, or the like, and this tailored auxiliary content may be played for the user during selected segments of the media asset, as above. That is, auxiliary content may be selected to match user preferences, likes, or interest, and played during selected media asset segments.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for inserting auxiliary content slots within portions of media assets determined to be of interest to users. More specifically, segments of a media asset being viewed by a user are identified as being of particular interest to the user, with reference to a stored set of user preferences. Segments of a media asset may be identified as belonging to one of a set of categories, such as a particular genre (action, drama, etc.), activity or event (event such as a car chase, fight or other conflict, conversation, etc.), and the like. User preferences are then consulted to determine which of these segments may be of likely interest to the viewer. Slots for auxiliary content, such as an advertisement, are then added to those segments deemed to be of likely interest. Auxiliary content such as ads may accordingly be displayed to a user at points within media assets at which the user is more likely to be paying attention, increasing the likelihood that auxiliary content will be viewed and perhaps interacted with by the user. In further embodiments of the disclosure, auxiliary content may also be selected according to user preferences, further increasing the likelihood that auxiliary content will be viewed.

Figure 1:
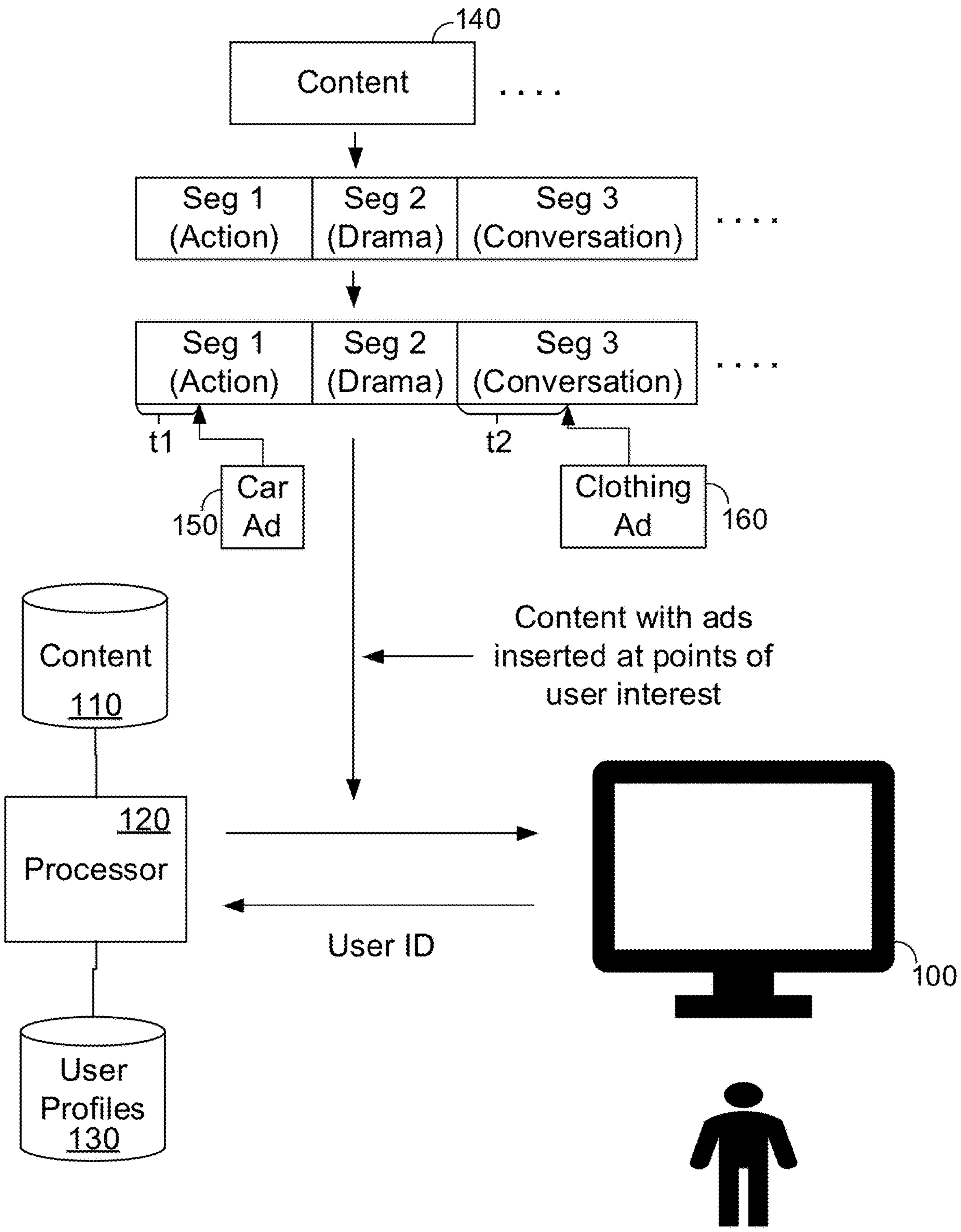
FIG. 1 conceptually illustrates operation of an exemplary system for allocation of auxiliary content slots within media assets, in accordance with embodiments of the disclosure.

FIG. 1 conceptually illustrates operation of an exemplary system for allocation of auxiliary content slots within media assets, in accordance with embodiments of the disclosure. Here, an exemplary system includes a display 100 in electronic communication with a processor 120. The processor 120 may be, for example, a remote electronic processing device such as a remote server, which is in turn in electronic communication with a content database 110 that stores media assets and/or auxiliary content, as well as a user profile storage 130 that stores one or more user profiles containing user content preferences.

In operation, processor 120 may retrieve content 140, such as a media asset, from content database 110 and transmit, such as stream, it for corresponding display by display 100.

In doing so, processor 120 may segment successive portions of content 140, i.e., identify them as belonging to particular categories or classes. In the example shown, processor 120 may identify any number of successive segments of content 140 as Seg 1, an action scene, followed by Seg 2, a drama scene, followed by Seg 3, a conversation. Segments Seg 1, Seg 2, and Seg 3 may be selected according to common features displayed, for example according to techniques further described below. That is, segments are chosen according to features identified therein, with changing features indicating the end of one segment and the beginning of another. Thus, for example, a particular scene featuring two actors in a car may have one segment in which both actors appear, with a new segment beginning when one actor steps out of the car, when the car starts or stops (i.e., engine noise begins or ends), conversation between the actors begins or ends, or the like. Embodiments of the disclosure contemplate determination of a new segment when any identified features change their state in any manner.

Once segments Seg 1, Seg 2, and Seg 3 are identified, processor 120 determines which of the segments are of likely interest to the current viewer. In particular, processor 120 categorizes or classifies each segment as belonging to a particular class or category of content, identifies categories of likely interest to the viewer, and determines which if any segments belong to classes or categories matching those of likely viewer interest.

Processor 120 may categorize segments Seg 1, Seg 2, and Seg 3, etc., in any manner using any method or process for assigning categories or classes to content segments, as further described below. Segments may be categorized or classified according to any scheme, such as belonging to a particular genre, containing a particular event or sequence such as a car chase or fight scene, or the like. Processor 120 may then retrieve the viewer's profile from user profile database 130 using the User ID of the viewer, where the retrieved profile may contain information including category preferences of the user. For example, the viewer's profile may include genres, e.g., drama, action, and the like, as well as specific types of scenes the viewer has viewed in the past, e.g., car chases, love scenes, combat scenes, and the like.

If any segment is classified as belonging to a class that the viewer's profile expresses a preference for, the processor 120 may mark that segment for auxiliary content insertion. In the example shown, the profile of the viewer may contain information indicating that the viewer has viewed several action scenes in the past, and has also expressed a preference for dialog such as monologues. Processor 120 thus marks Seg 1, categorized as an action scene, and Seg 3, categorized as a conversation, for auxiliary content insertion. Processor 120 may select any auxiliary content for insertion. In this case, processor 120 may select auxiliary content having a label or category that it determines as corresponding to the determined categories of Seg 1 and Seg 3. For example, as shown, processor 120 may select a car ad 150 for insertion into Seg 1, and may select a less action-related ad, such as a clothing ad 160, for insertion into Seg 3.

Ads 150 and 160 may be inserted into their respective segments Seg 1 and Seg 3 in any manner and at any positions or time indexes. As one example, processor 120 may determine periods of low volume or static image, and insert ads 150, 160 within those periods. As another example, processor 120 may insert ads 150, 160 at the beginning or end of Segs 1 and 3. As yet another example, processor 120 may transcribe words spoken during Seg 1 and Seg 3, determine the times at which those words are spoken, and insert ads 150, 160 at time indexes between spoken words or between strings or sequences of words, to minimize interruption. Here, processor 120 may insert ad slots at time indexes t1 within Seg 1, and t2 within Seg 3, corresponding perhaps to a lull in the action of Seg 1 and a gap in the conversion of Seg 3. In this manner, the viewer may be presented with a car ad 150 during Seg 1, an action sequence that he or she is determined to be likely interested in viewing, and may also be presented with a clothing ad 160 during Seg 3, a conversation that he or she is similarly likely to wish to view. This increases the likelihood that the viewer will view both ads 150, 160.

Figure 2:
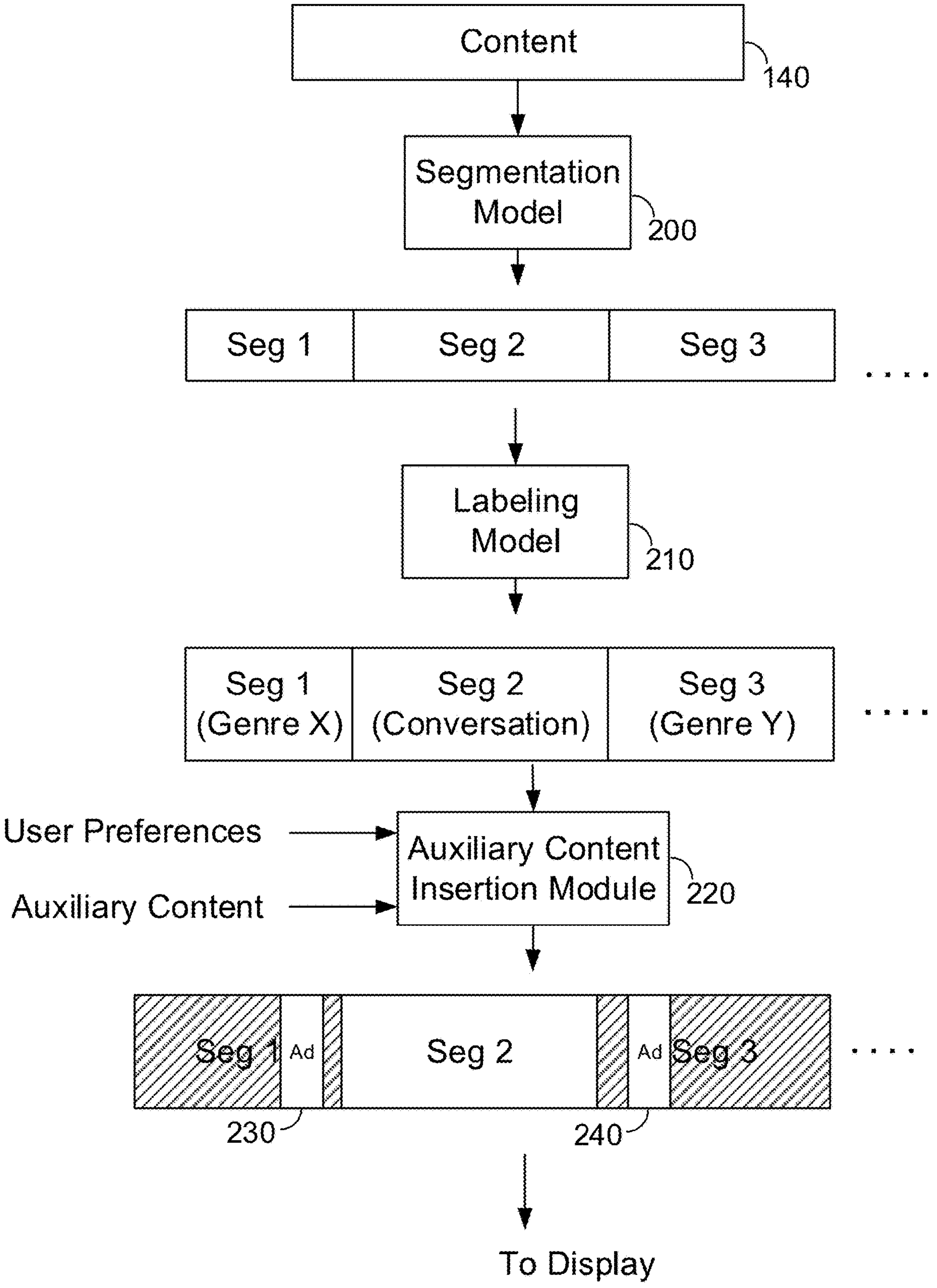
FIG. 2 conceptually illustrates further details of operation of an exemplary system for allocation of auxiliary content slots within media assets, in accordance with embodiments of the disclosure.

FIG. 2 conceptually illustrates further details of operation of an exemplary system for allocation of auxiliary content slots within media assets, in accordance with embodiments of the disclosure. Here, content 140 is input to a segmentation model 200 which divides content 140 into a series of segments Seg 1, Seg 2, Seg 3, and so on. As above, segmentation model 200 divides content 140 into segments representing portions each containing a particular set of attributes, such as a particular set of actors, objects, settings, events, sights, sounds, or the like. Changes in these attributes may signal the end of one segment and the beginning of the next.

Segmentation model 200 may be, for example, any set of computer-implemented instructions for dividing content 140 into segments Seg n. In some embodiments of the disclosure, segmentation model 200 may be a set of instructions implementing one or more machine learning models. These models may include a model such as a convolutional neural network model trained to segment input content. More specifically, a convolutional neural network model may be configured to receive a content stream as input, and to output likelihoods of a segment boundary, i.e., the end of one segment and the beginning of another. The model may thus be trained using training sets containing content streams with labeled segment transition points.

In particular, the model may also be trained to identify attributes such as people and objects within input content, as well as voices and sounds. This may be accomplished in known manner, using convolutional neural networks trained using training sets including content streams labeled with the identities of the various attributes employed, e.g., people, objects, voices, sounds, and the like. From the labeled segment transition points, the model learns to associate segment transitions with changes in attribute states, such as the appearance/disappearance of people or objects in a scene, changes in voices and sounds, and the like. Identified attributes may be associated with each identified segment as metadata. It is noted that embodiments of the disclosure include systems and methods in which segments Seg n are determined in any other manner. For example, segments Seg n may be predetermined, such as by the content provider or another entity.

Once segments are identified, labeling model 210 may label each identified segment with a corresponding plot element label. Labeling model 210 may be, for example, any set of computer-implemented instructions for determining plot elements of content segments. In some embodiments of the disclosure, labeling model 210 may be a set of instructions implementing one or more machine learning models. These models may include a model such as a convolutional neural network model trained to determine plot elements of content segments. More specifically, a convolutional neural network model may be configured to receive input content segments and associated metadata attributes such as those determined and appended by segmentation model 200. The model may then output likelihoods of predetermined plot elements, such as belonging to a particular genre (e.g., action, drama, comedy, etc.) or containing an occurrence of a particular event (e.g., car chase, conversation, etc.), although any set of plot elements may be employed. The model may thus be trained using training sets containing content segments and their attribute metadata, where the segments are labeled with their corresponding plot element. Output plot element designations may then be added to segment metadata, to produce a set of segments labeled with corresponding determined plot elements or events. These labeled segments may then be input to auxiliary content insertion module 220, as shown.

The auxiliary content insertion module 220 selects auxiliary content likely to be of interest to the viewer, and inserts it within those segments Seg n that are also deemed likely to be of interest to the viewer. Auxiliary content insertion module 220 may thus, for example, perform the functions of selecting auxiliary content likely to be of interest to the viewer, determining which segments Seg n are deemed likely to be of interest, and inserting selected auxiliary content therein.

To determine which segments Seg n are likely to be of interest to the viewer, Auxiliary content insertion module 220 may compare segments Seg n to retrieved user preferences, to determine which segments Seg n may be likely to be of interest to the viewer. Auxiliary content insertion module 220 may thus include, for example, any set of computer-implemented instructions for comparing metadata labels of segments Seg n to content preferences of a retrieved user profile. Comparison may be rule based, with embodiments of the disclosure contemplating use of any rules or criteria. That is, any rules or criteria for determining whether segment metadata bears sufficient similarity to retrieved user preferences may be employed. For example, insertion module 230 may select segments from among Seg n if segment metadata includes one or more attributes in common with the retrieved list of user preferences. Any number of common attributes may be employed as selection criteria, however.

To determine auxiliary content that is likely to be of interest to the viewer, auxiliary content insertion module 220 parses user preferences from user profile database 130 and compares these preferences to labels of each segment Seg n. Auxiliary content insertion model 220 may include, for example, any set of computer-implemented instructions for selecting auxiliary content according to matches between the auxiliary content and user preferences expressed in a retrieved user profile. In some embodiments of the disclosure, insertion module 220 may be a set of instructions implementing a routine that retrieves content type preferences from, e.g., a retrieved set of user preferences, and compares these preferences to metadata of auxiliary content. Insertion module 220 may select auxiliary content that is sufficiently similar to the retrieved set of user preferences. Selection may be rule based, with embodiments of the disclosure contemplating use of any rules or criteria. That is, any rules or criteria for determining whether metadata or labels of auxiliary content bears sufficient similarity to retrieved user preferences may be employed. For example, selection model 160 may select auxiliary content if its labels or metadata include two or more attributes in common with the retrieved list of user preferences. Any number of common attributes may be employed as selection criteria, however. Alternatively, any other criteria may be employed. For instance, certain attributes may be deemed or flagged as more important than others, such that matches between any one of these attributes may result in segment selection. Determination of auxiliary content likely to be of interest is optional. Accordingly, some embodiments of the disclosure may select auxiliary content in any other manner, regardless of whether it may be deemed of interest to any particular user.

Auxiliary content insertion module 220 then inserts the selected auxiliary content into those segments deemed likely to be of interest to the viewer. Selected auxiliary content may be inserted into any point or time index within selected segments Seg n, in any manner. For example, selected auxiliary content may be inserted at a randomly determined time index within its selected segment Seg n, may be inserted at the beginning or end of the selected segment Seg n, or in any other manner. As a further example, insertion module 220 may determine, and insert auxiliary content at, periods of low volume or static image within selected segment Seg n. As yet another example, insertion module 220 may transcribe words spoken during the selected segment Seg n, determine the times at which those words are spoken, and insert auxiliary content at time indexes between spoken words or between strings or sequences of words, to minimize interruption. Auxiliary content insertion module 220 may thus include, for example, any set of computer-implemented instructions for carrying out NLP to transcribe language uttered during a segment Seg n, instructions for identifying quiet periods (i.e., frames having associated volume levels below any predetermined threshold) and/or still images, or the like.

As above, auxiliary content insertion module 220 may first select auxiliary content that corresponds to the properties of the selected segment Seg n, having one or more common attributes. In this manner, for instance, the viewer may be presented with an ad 230 matching the segment Seg 1 during which it is played. For example, if Genre X is "action," i.e., if Seg 1 is determined to be an action sequence, insertion module 220 may insert an ad 230 that is a car ad, ad for a weapon or sports equipment, or the like. Similarly, if Genre Y is an "emotional scene," insertion module 220 may insert an ad 240 that is an ad for flowers, candies, or the like.

Auxiliary content insertion module 220 may insert its selected auxiliary content in any manner, at any frequency. As an example, module 220 may insert any one or more of a predetermined maximum number of auxiliary content pieces per segment selected as being likely to be of interest to the viewer, or a predetermined minimum and/or maximum number of auxiliary content pieces per media asset. Similarly, module 220 may weight auxiliary content insertion toward a predetermined portion of the media asset, e.g., toward the beginning or end of the media asset, perhaps according to user or other selection or preference. Embodiments of the disclosure contemplate any amount or number of auxiliary content pieces, inserted in any manner within any portions of a media asset deemed likely to be of interest.

Figure 3:
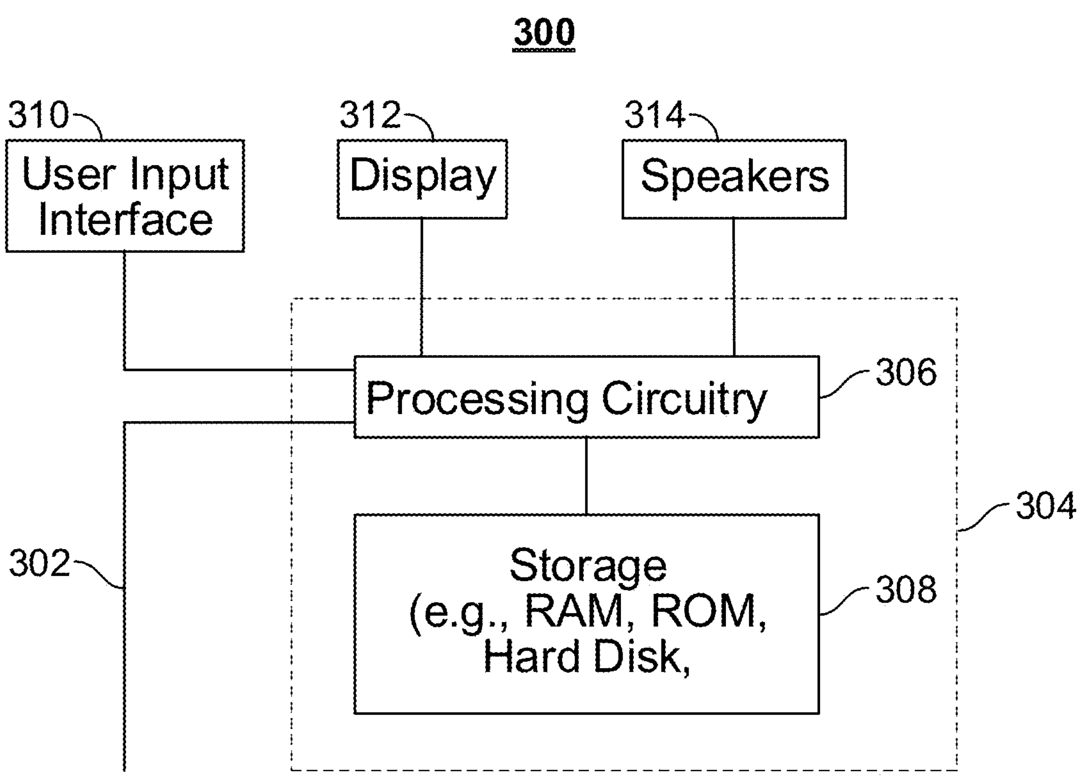
FIG. 3 is a block diagram of illustrative user equipment, in accordance with some embodiments of this disclosure.
Figure 4:
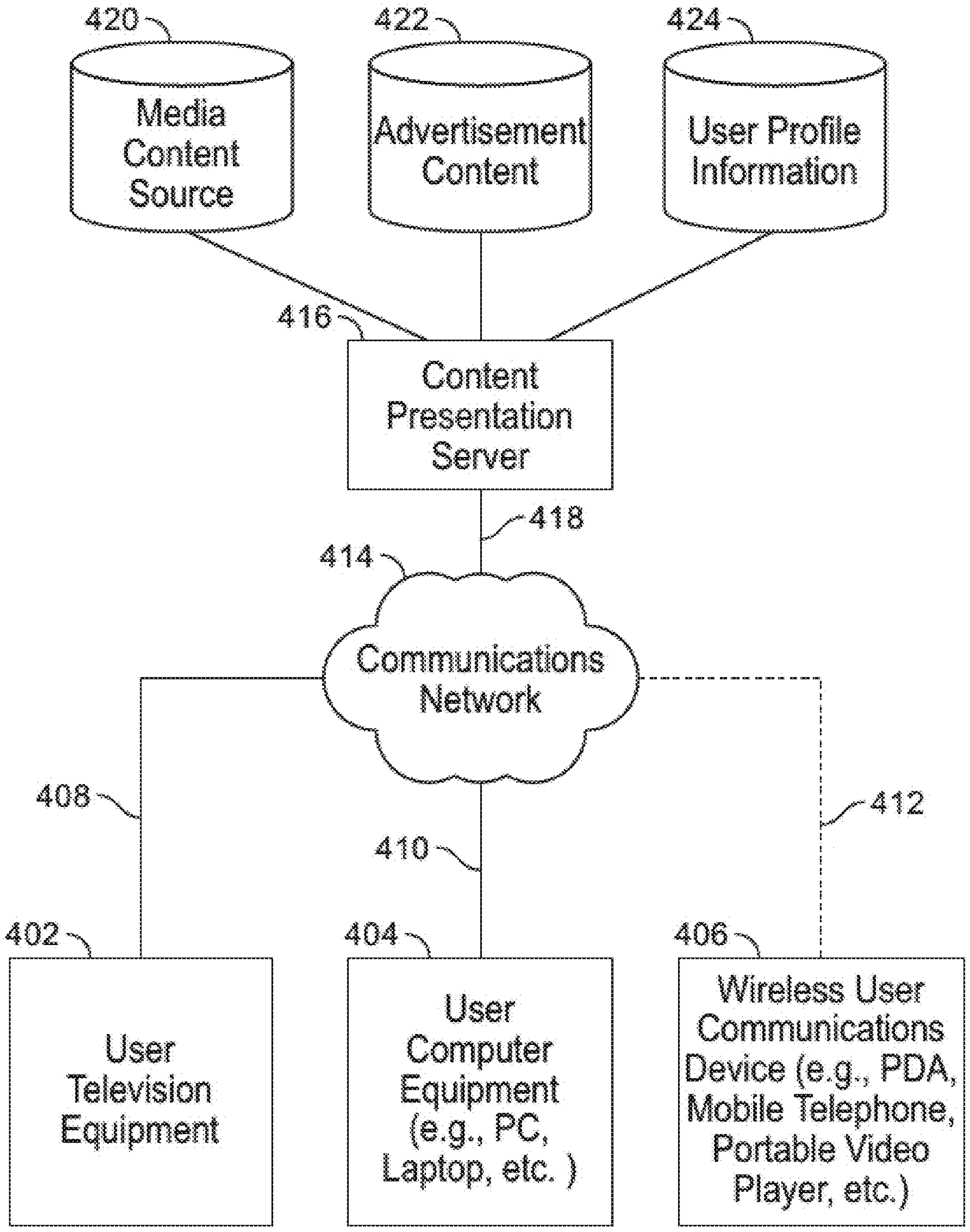
FIG. 4 is a block diagram of an illustrative system, in accordance with some embodiments of this disclosure.

FIGS. 3-4 show exemplary devices, systems, servers, and related hardware for allocation of auxiliary content slots within media assets, in accordance with some embodiments of this disclosure. As shown in FIG. 3, user equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a content presentation application stored in memory (i.e., storage 308). Specifically, control circuitry 304 may be instructed by the content presentation application to perform the functions discussed above and below. For example, the content presentation application may provide instructions to control circuitry 304 to generate the above-described displays. In some implementations, any action performed by control circuitry 304 may be based on instructions received from the content presentation application.

In client/server-based embodiments, control circuitry 304 may include communications circuitry suitable for communicating with a content presentation server (e.g., server 416 in FIG. 4) or other networks or servers. The instructions for carrying out the above-mentioned functionality may be stored on the content presentation server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as content data and content application data that are described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and down-converting content into the preferred output format of the user equipment device 400. Control circuitry 304 may also include digital-to-analog converter circuitry and analog-to-digital converter circuitry for converting between digital and analog signals. The tuning and encoding circuitry may be used by the user equipment device to receive and to display, to play, or to record content. In some embodiments, the control circuitry may include an HD antenna.

In one embodiment, speakers 314 may be provided as integrated with other elements of user equipment device 300 or may be stand-alone units. The audio and other content displayed on display 312 may be played through speakers 314. In some embodiments, the audio may be distributed to a receiver (not shown), which processes and outputs the audio via speakers 314.

The content presentation application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected. User input interface 310 may be any suitable user interface (e.g., a remote control, mouse, trackball, keypad, keyboard, touch screen, touchpad, stylus input, joystick, microphone, voice recognition interface, or other user input interfaces). Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312.

In some embodiments, the content presentation application is a client/server-based application. Data for use by a thick or thin client implemented on user equipment device 300 is retrieved on-demand by issuing requests to a server remote to the user equipment device 300. In one example of a client/server-based content presentation application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the content presentation application is downloaded and interpreted or otherwise run by an interpreter or virtual machine (run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the application may be, for example, encoded and transmitted in an MPEG-2 object carousel with the MPEG audio and video packets of a program.

FIG. 4 shows an illustrative block diagram of system 400 for allocation of auxiliary content slots within media assets, in accordance with some embodiments of this disclosure. System 400 may include a user equipment device (e.g., user television equipment 402, user computer equipment 404, wireless user communications device 406), content presentation server 416, media content source 420, advertisement content database 422, and user profile information database 424. Although FIG. 4 shows media content source 420, advertisement content database 422, and user profile information database 424 as individual components and as separate from content presentation server 416, in some embodiments, any of those components may be combined and/or integrated with content presentation server 416. Media content database 110, any advertisement content storage contemplated by FIG. 1, and user profile information database 130 may be implemented as media content source 420, advertisement content database 422, and user profile information database 424, respectively. Content presentation server 416 may be communicatively coupled to a user equipment device by way of communications network 414 (e.g., via communications path 418) and may be communicatively coupled to media content source 420, advertisement content database 422, and user profile information database 424, which may be included in, or separate from, communications network 414. Content presentation server 416 may be configured to retrieve content from media content source 420 for consumption at a user equipment device (e.g., user television equipment 402, user computer equipment 404, wireless user communications device 406), retrieve advertisement content from advertisement content database 422 to be presented prior to, or during, presentation of the desired content (e.g., in the example of FIG. 1 and FIG. 2), and retrieve user profile information from user profile information database 424 (e.g., to assist in selection of auxiliary content or media asset segments of likely user interest). Content presentation server 416 may have a similar configuration to user equipment 300 (e.g., the content presentation server 416 may include I/O path 302 and control circuitry 304 including storage 308 and processing circuitry 306), although the content presentation server may not include a user input interface, a display, or speakers. The server may store and execute various software modules (e.g., the content presentation application), which may be stored in storage of the server and executed via processing circuitry of the server, for implementing the content presentation functionality of the system 400. In some embodiments, media content source 420, advertisement content database 422, and user profile information database 424 may communicate directly with user equipment devices 402, 404, and 406 via communication paths (not shown).

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a content presentation application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some user television equipment 402, include a tuner allowing for access to television programming. The content presentation application may have the same layout on various different types of user equipment or may be tailored to the display capabilities of the user equipment. For example, on user computer equipment 404, the content presentation application may be provided as a web site accessed by a web browser. In another example, the content presentation application may be scaled down for wireless user communications devices 406.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 602-11x, etc.), or other short-range communication via wired or wireless paths. BLUETOOTH is a certification mark owned by Bluetooth SIG, INC. The user equipment devices may also communicate with each other directly through an indirect path via communications network 414.

Media content source 420 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 420 may be the originator of content (e.g., a television broadcaster, a Webcast provider, etc.) or may not be the originator of content (e.g., an on-demand content provider, an Internet provider of content of broadcast programs for downloading, etc.). Media content source 420 may include cable sources, satellite providers, on-demand providers, Internet providers, over-the-top content providers, or other providers of content. Media content source 420 may also include a remote media server used to store different types of content (including video content selected by a user), in a location remote from any of the user equipment devices.

Content presentation applications may be, for example, stand-alone applications implemented on user equipment devices. For example, the content presentation application may be implemented as software or a set of executable instructions which may be stored in storage 308, and executed by control circuitry 304 of user equipment device 300. In some embodiments, content presentation applications may be client-server applications where only a client application resides on the user equipment device, and server application resides on a remote server. For example, content presentation applications may be implemented partially as a client application on control circuitry 304 of user equipment device 300 and partially on a remote server as a server application (e.g., content presentation server 416) running on control circuitry of the remote server. When executed by control circuitry of the remote server (such as content presentation server 416), the content presentation application may instruct the control circuitry to insert auxiliary content (e.g., an advertisement) prior to or during desired content, as described herein. The server application may instruct the control circuitry of the content presentation server 416 to transmit data for storage on the user equipment. The client application may instruct control circuitry of the receiving user equipment to provide auxiliary content insertion functionality (e.g., as in the examples of FIGS. 1-2).

Content and/or media player data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media player data described above. In addition to content and/or media player data, providers of OTT content can distribute content presentation applications (e.g., web-based applications or cloud-based applications), or the content can be displayed by content presentation applications stored on the user equipment device.

Media player system 400 is intended to illustrate a number of approaches, or network configurations, by which user equipment devices and sources of content may communicate with each other for the purpose of accessing content and auxiliary content insertion functionality (e.g., in the examples of FIGS. 1-2). The embodiments described herein may be applied in any one or a subset of these approaches, or in a system employing other approaches for delivering content and providing auxiliary content insertion functionality.

Figure 5:
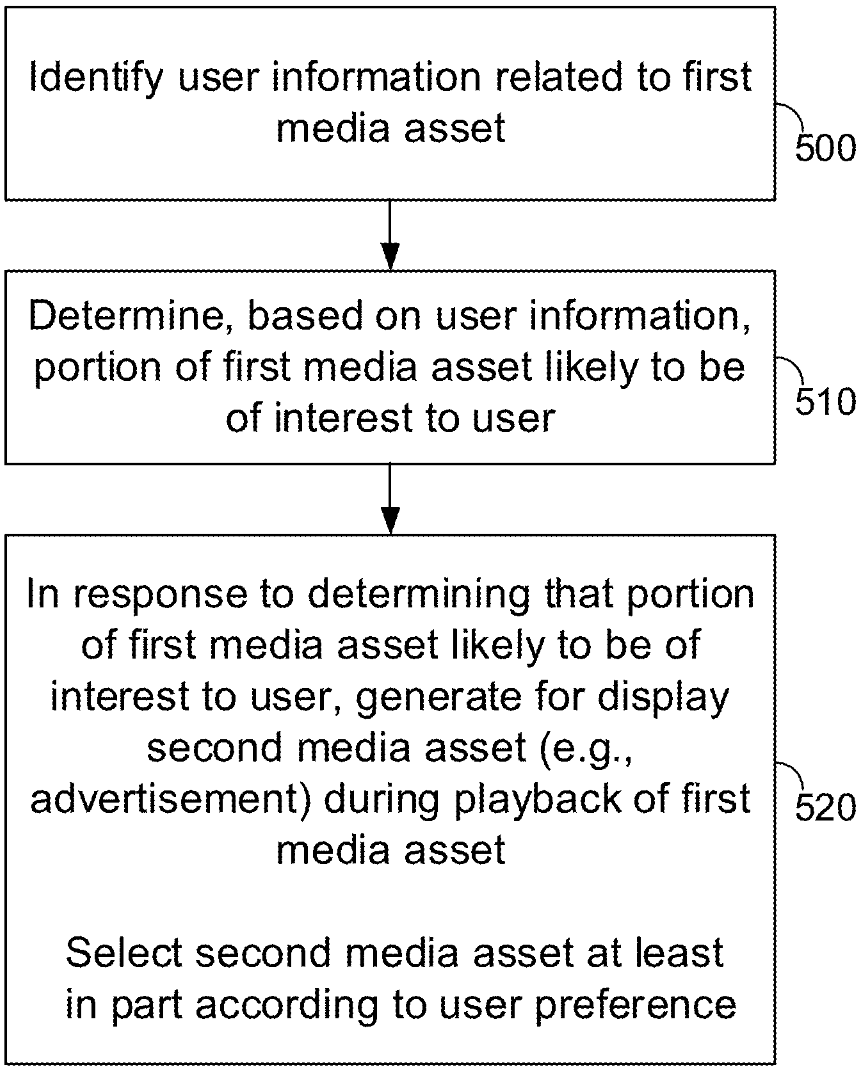
FIG. 5 is a flowchart of a detailed illustrative process for allocation of auxiliary content slots within media assets, in accordance with some embodiments of this disclosure.

FIG. 5 is a flowchart of a detailed illustrative process for allocation of auxiliary content slots within media assets, in accordance with some embodiments of this disclosure. The process begins when, for example, processor 120 identifies user information related to a first media asset (Step 500). As above, processor 120 retrieves a user profile for the viewer of a media asset, from user profile database 130. Processor 120 then determines, based on this user information, portions of the first media asset, i.e., the content being viewed by the viewer corresponding to the retrieved user profile, that are likely to be of interest to the user (Step 510). As above, processor 120 may execute a segmentation model 200 and labeling model 210 to divide the viewed media asset into segments Seg n labeled as belonging to particular genres or containing certain events or occurrences. Processor 120 may also execute an auxiliary content insertion module 220 comparing retrieved user preferences to these labels, so as to determine those segments Seg n whose labels sufficiently correspond to attributes of content preferred by the user, as expressed in his or her retrieved user preferences.

Processor 120, in response to determining that portions of the first media asset are likely to be of interest, generates for display a second media asset, such as an advertisement, during playback of the first media asset (Step 520), and in particular during the segment Seg n of the first media asset that is determined to be of interest to the viewer.

As above, the second media asset, e.g., advertisement, may, though need not necessarily, be selected at least in part according to the retrieved user preferences. In particular, ads or other auxiliary content can be selected according to correspondences between desired attributes expressed in the user preferences and labels or other metadata characterizing the auxiliary content, and/or between user preference attributes and labels characterizing segments Seg n.

Figure 6:
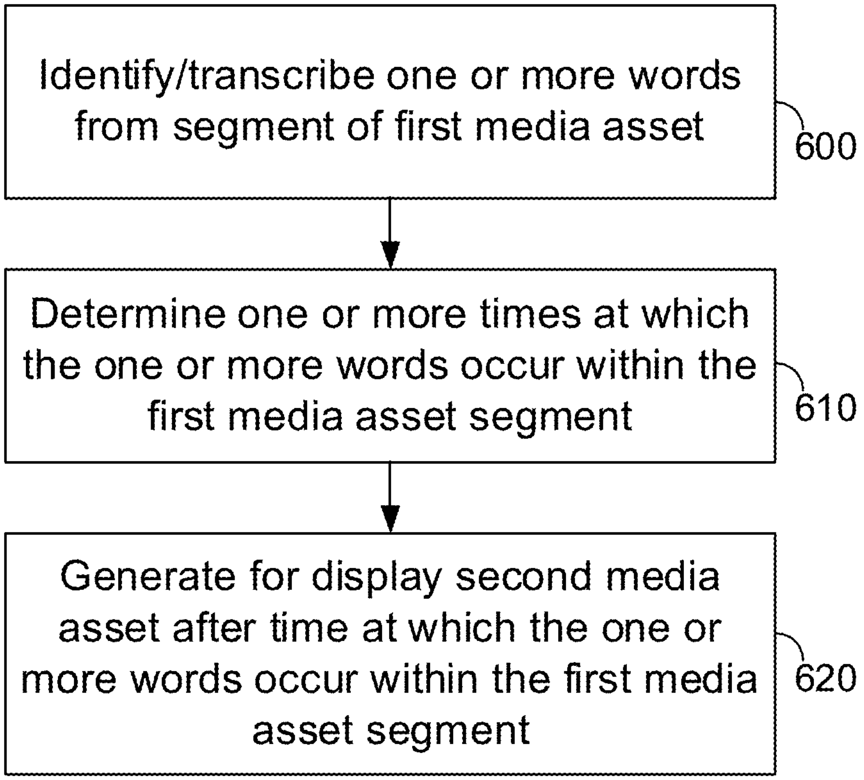
FIG. 6 is a flowchart of a detailed illustrative process for allocation of auxiliary content slots between words uttered within media assets, in accordance with some embodiments of this disclosure.

FIG. 6 is a flowchart of a detailed illustrative process for allocation of auxiliary content slots between words uttered within media assets, in accordance with some embodiments of this disclosure. As above, auxiliary content may be inserted at any desired point within any segment Seg n deemed of likely interest to the viewer. In some embodiments of the disclosure, auxiliary content may be inserted so as to avoid interrupting spoken words within the displayed media asset. In particular, processor 120 may identify or transcribe one or more words from a segment Seg n (Step 600) deemed of likely interest to the viewer. Word transcription may be accomplished via any one or more NLP methods, many of which are known. The processor 120 may then determine times at which these transcribed words occur within the segment Seg n (Step 610), and generate the second media asset for display at any appropriate time, such as after the time at which the transcribed words occur within segment Seg n (Step 620). In this manner, auxiliary content may be displayed for the viewer in a less intrusive manner which avoids excessive interruption of the user's viewing experience.

Figure 7:
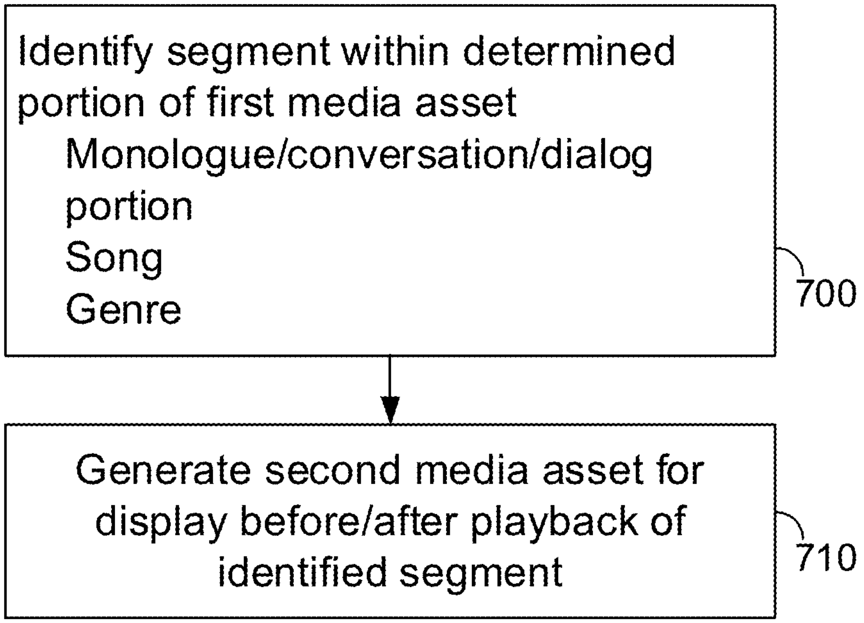
FIG. 7 is a flowchart of a detailed illustrative process for media asset segment identification and auxiliary content insertion therein, in accordance with some embodiments of this disclosure.

FIG. 7 is a flowchart of a detailed illustrative process for media asset segment identification and auxiliary content insertion therein, in accordance with some embodiments of this disclosure. As above, segments Seg n may be identified or selected according to distinct content portions they may represent. That is, for example, segments may be selected for their correspondence to events within their media asset, such as a conversation, a monologue, or particular dialog portion, a genre, a song, an action scene such as a fight scene or car chase, or the like. Any manner of identifying any one or more events or occurrences in a media asset is contemplated for determination of a segment, and segments may be determined as corresponding to any such event or occurrence. Accordingly, as above, processor 120 may identify a segment within a media asset (Step 700), where this segment is defined to encompass any detected event or occurrence. More specifically, segmentation model 200 may identify segments of content according to one or more machine learning models trained to identify transitions between content segments having differing attributes such as voices, persons, objects, actions, or the like. Other media assets such as auxiliary content may then be generated for display at some desired point within those identified segments that are deemed likely to be of user interest, or before/after such segments (Step 710).

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, media segments may be determined in any manner, such as by machine learning model, heuristic, rule set, or via any other suitable mechanism. Similarly, auxiliary content may be placed at any point within media segments, such as between spoken words, before or after such segments, or the like. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A computer-implemented method comprising:

retrieving, from a user profile, a plurality of preferences;

identifying a content item;

identifying a scene of the content item, wherein a first portion of the scene is associated with a first plot element;

identifying a transition point in the scene at which the first portion of the scene associated with the first plot element changes to a second portion of the scene associated with a second plot element;

identifying, based at least in part on identifying the transition point, an end of the first portion of the scene and a start of the second portion of the scene;

determining, based at least in part on the first plot element and the second plot element, that the first portion and the second portion align with one or more of the plurality of preferences;

modifying metadata associated with the scene to add a content insertion slot at a timepoint between the end of the first portion and the start of the second portion; and based at least in part on playing of the content item reaching the timepoint, causing presentation of content indicated by the content insertion slot.

2. The method of claim 1, wherein at least one of the first plot element or the second plot element comprises a visual element.

3. The method of claim 1, wherein one of the first plot element or the second plot element comprises an audio component, wherein the audio component is present in a respective portion of the first portion or the second portion, and wherein the audio component stops in the other portion of the first portion or the second portion.

4. The method of claim 1, wherein identifying the transition point in the scene at which the first portion of the scene associated with the first plot element changes to the second portion of the scene associated with the second plot element comprises:

identifying, using a machine learning model, the first plot element in the first portion;

determining, using the machine learning model, that the first plot element in the first portion changes to the second plot element in the second portion; and associating, using the machine learning model, the transition point to the first portion changing to the second portion.

5. The method of claim 1, wherein the first portion depicts one or more characters in a first setting, wherein identifying the transition point comprises determining that at least one character, of the one or more characters depicted in the first portion, is depicted in a second setting in the second portion.

6. The method of claim 1, further comprising:

determining a genre of the scene; and wherein the content insertion slot indicates content associated with the genre.

7. The method of claim 1, wherein the content insertion slot indicates content associated with at least one of the first plot element or the second plot element.

8. The method of claim 1, wherein the first portion comprises an action sequence, and wherein the second portion is subsequent to the action sequence.

9. The method of claim 1, wherein the first portion comprises a spoken dialogue, the method further comprising:

determining, via natural language processing, a cohesive segment of words associated with the spoken dialogue;

wherein the timepoint is subsequent to the cohesive segment of words; and wherein the content insertion slot is added at the timepoint that is subsequent to the cohesive segment of words.

10. The method of claim 1, wherein causing the presentation of the content indicated by the content insertion slot comprises transmitting, to a device at which the content is to be presented, the content indicated by the content insertion slot.

11. A system comprising:

communications circuitry configured to retrieve user data; and control circuitry configured to:

retrieve, from a user profile via the communications circuitry, a plurality of preferences;

identify a content item;

identify a scene of the content item, wherein a first portion of the scene is associated with a first plot element;

identify a transition point in the scene at which the first portion of the scene associated with the first plot element changes to a second portion of the scene associated with a second plot element;

identify, based at least in part on identifying the transition point, an end of the first portion of the scene and a start of the second portion of the scene;

determine, based at least in part on the first plot element and the second plot element, that the first portion and the second portion align with one or more of the plurality of preferences;

modify metadata associated with the scene to add a content insertion slot at a timepoint between the end of the first portion and the start of the second portion; and based at least in part on playing of the content item reach the timepoint, causing presentation of content indicated by the content insertion slot.

12. The system of claim 11, wherein at least one of the first plot element or the second plot element comprises a visual element.

13. The system of claim 11, wherein one of the first plot element or the second plot element comprises an audio component, wherein the audio component is present in a respective portion of the first portion or the second portion, and wherein the audio component stops in the other portion of the first portion or the second portion.

14. The system of claim 11, wherein the control circuitry, when identifying the transition point in the scene at which the first portion of the scene associated with the first plot element changes to the second portion of the scene associated with the second plot element, is configured to:

identify, using a machine learning model, the first plot element in the first portion;

determine, using the machine learning model, that the first plot element in the first portion changes to the second plot element in the second portion; and associate, using the machine learning model, the transition point to the first portion changing to the second portion.

15. The system of claim 11, wherein the first portion depicts one or more characters in a first setting, and wherein the control circuitry, when identifying the transition point, is configured to determine that at least one character, of the one or more characters depicted in the first portion, is depicted in a second setting in the second portion.

16. The system of claim 11, wherein the control circuitry is further configured to:

determine a genre of the scene; and wherein the content insertion slot indicates content associated with the genre.

17. The system of claim 11, wherein the content insertion slot indicates content associated with at least one of the first plot element or the second plot element.

18. The system of claim 11, wherein the first portion comprises an action sequence, and wherein the second portion is subsequent to the action sequence.

19. The system of claim 11, wherein the first portion comprises a spoken dialogue, and wherein the control circuitry is further configured to:

determine, via natural language processing, a cohesive segment of words associated with the spoken dialogue;

wherein the timepoint is subsequent to the cohesive segment of words; and wherein the content insertion slot is added at the timepoint that is subsequent to the cohesive segment of words.

20. The system of claim 11, wherein the control circuitry, when causing the presentation of the content indicated by the content insertion slot, is configured to transmit, to a device at which the content is to be presented, the content indicated by the content insertion slot.

* * * * *